April 14, 1931.  G. VIARD  1,801,182
DEVICE FOR THE MAINTENANCE OF TELEGRAPH,
TELEPHONE, OR SIGNALING LINES
Filed Feb. 28, 1929   2 Sheets-Sheet 1

Inventor.
Georges Viard.
By Stone, Boyden, Mack & Hahn.
Attorneys.

Patented Apr. 14, 1931                                        1,801,182

UNITED STATES PATENT OFFICE

GEORGES VIARD, OF PARIS, FRANCE

DEVICE FOR THE MAINTENANCE OF TELEGRAPH, TELEPHONE, OR SIGNALING LINES

Application filed February 28, 1929, Serial No. 343,538, and in France March 8, 1928.

The object of the invention is to provide a device for use in telecommunication lines comprising phantom circuits, for automatically indicating a weakening in the insulation of a conductor, for locating earth-leakages, and for measuring the insulation-resistance of a number of conductors with reference to the earth, without interfering with the operation of the lines.

The invention is characterized by the feature that the middle points of the line windings of the terminal transformers which couple the phantom circuit are used as tapping points.

According to the present invention the middle point of the line windings of the transformers situated at one end of the phantom circuit, made in a group of conductors, is insulated, and the middle point of the corresponding windings of the transformers situated at the opposite end is connected either to a device for indicating insulation faults or to a high-impedance apparatus. In this way warning is given of any leakage in the insulation, and the insulation-resistance, with reference to the earth, of certain conductors may be measured.

The device for automatically indicating a fault in the insulation may comprise an electromagnet or other sensitive relay device connected between the middle point, chosen as indicated above, and one of the poles of a continuous current generator, the other pole of which is earthed. If all the conductors of the line are well insulated from earth, no current will flow through the windings of the electromagnet; if, on the contrary, one or more of the conductors leak to earth, an earth return circuit will be formed and a current will pass through the windings of the electromagnet, which will attract its armature and complete a circuit for a warning device (lamp, bell etc.).

The insulation-resistance to be measured is that of the conductors in parallel; it is measured by the voltmeter method, that is to say, the tapping point previously connected to a warning device, is now connected through a high-impedance voltmeter to one of the poles of a continuous current generator, the other pole of which is earthed.

A further object of the invention is a method for locating earth leakages, by employing the middle points of the terminal transformers coupling the phantom circuits. The method is based on the fact that if $n$ identical conductors of the same length are connected together at their extremities, and if a potential difference is established between the extremities, corresponding points of the $n$ conductors are at the same potential. From this fact the following is derived:—

1. The distribution of the potentials of the system is not changed when two or more of the conductors are joined together for a part of their length to form a single conductor, if the conductance of the resultant conductor is equal to the sum of the conductances of the conductors which the resultant conductor replaces.

2. Conversely: a single conductor may be replaced for the whole or part of its length by $n$ identical conductors.

From the above, it is clear that the different groups of conductors of the line, having their extremities connected through the line windings of the terminal transformers, may be considered as single conductors. The usual locating methods, such as Murray's loop or Varley's loop, used with such a conductor, will be employed when the earth leakage affects all or part of the conductors at the same place in the cable or line.

The invention will now be described with reference to the accompanying drawings which show, by way of example, the application of the invention to a "quad", i. e. a group of conductors in a telephone cable consisting of two pairs which may be stranded with one another.

Figure 1:
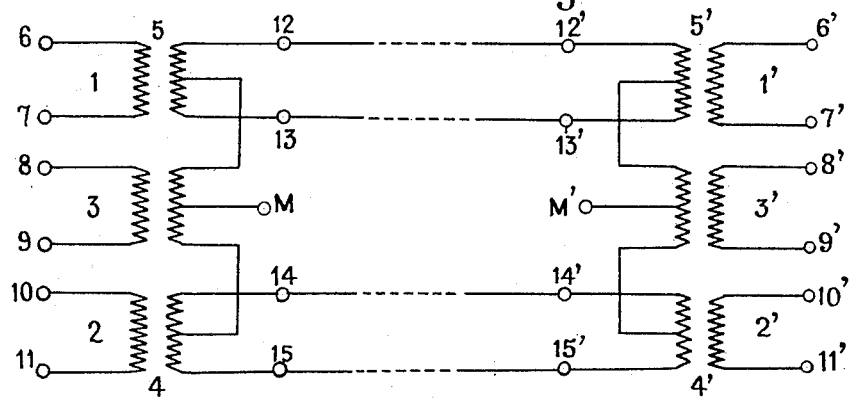
Figure 1 is a diagram of the three circuits of such a quad.

Referring to Figure 1, this shows the three circuits of the quad, 1, $1^1$, 2, $2^1$, being the two real circuits. By means of the coupling transformers, 4, $4^1$, 5, $5^1$, these two circuits form a phantom circuit 3, $3^1$. At each end of the line, M and $M^1$ are the middle points of the line windings of the coupling transformers of the phantom circuit 3, $3^1$. If $M^1$ is insulated, and M is connected to a warning device for insulation faults, or to a high-impedance apparatus for measuring insulation-resistances, the condition of the four conductors of the quad with reference to their insulation from the earth, may be ascertained without interfering with the working of these circuits, especially if the warning and measuring devices present high-impedances. This results from the manner in which the real and phantom circuits of a "quad" function.

When an insulation fault occurs in a quad, attention should be called to it as soon as possible. For this purpose the insulation test for calling attention to a defect is made on each quad of the telephone line, either continuously or automatically at short intervals of time. The insulation resistance is only measured on a quad signaled as being faulty, and the result of the measurement reveals the importance of the defect. Normally, the measuring apparatus is out of circuit or short-circuited, according to the most suitable arrangement. In the same way, during the measuring of the insulation resistance, the warning device should be cut out of circuit or short-circuited. A simple way of complying with these conditions consists in putting the windings of the electromagnet or sensitive relay in series with the voltmeter between the tapping point M and the pole 16 of the battery, (Figure 2); a double throw switch allows the terminal 17 to be connected alternatively to 18 or 16, thus short-circuiting, in turn, the electromagnet or sensitive relay and the voltmeter. In order to keep the resistance between the tapping point M and the pole 16 constant in both cases, a resistance $R_1$ of suitable value is inserted in series with the voltmeter between 16 and 17, or a suitable resistance $R_2$ is inserted in series with the windings of the electromagnet or sensitive relay between 17 and 18, according to the circumstances.

The four conductors of the cable and the covering material form a condenser the charging and discharging of which, when the conductors are connected to the poles of the generator, one pole of which is earthed, may involve comparatively large currents. To prevent these currents from passing through the warning or measuring apparatus the test comprises three operations:

*Charging-measuring-discharging*

Figure 2:
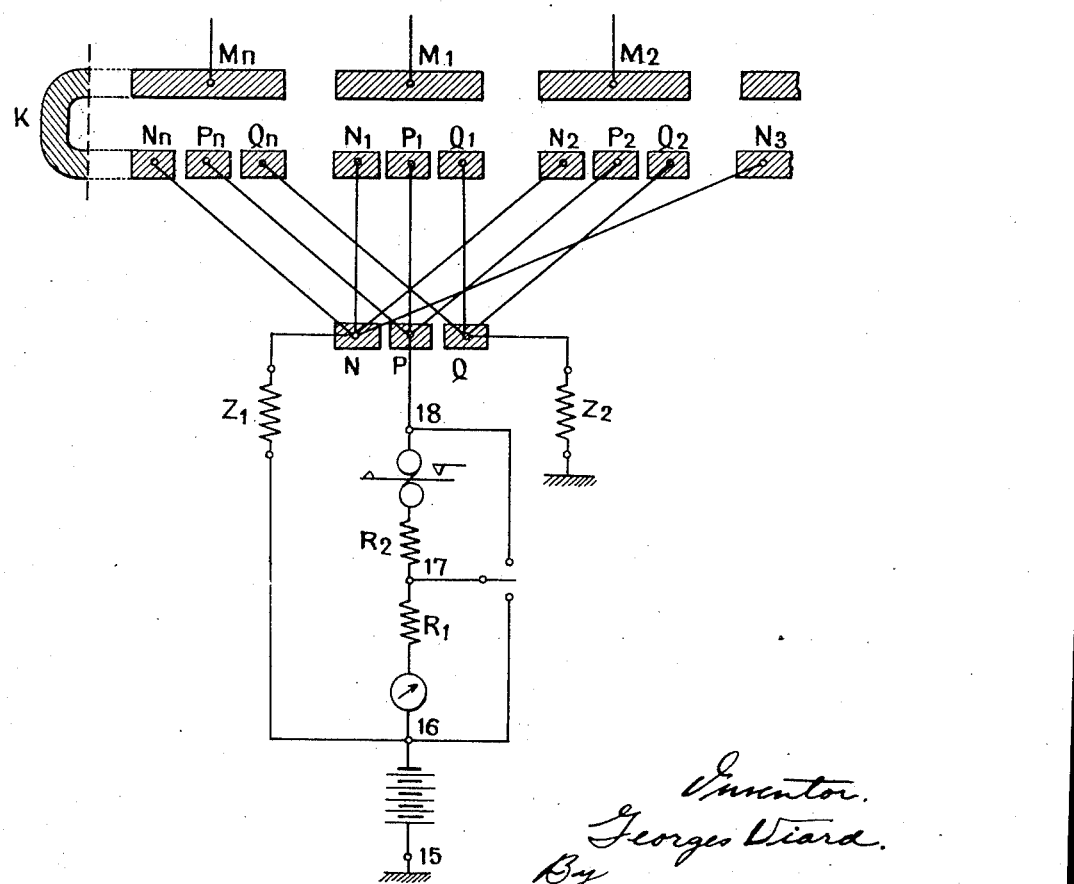
Figure 2 shows a method for continuously or periodically testing a telephone line formed by a quad, or by a plurality of quads, and also a method for measuring the insulation-resistance, with reference to the earth, of a quad or of several quads which have been signaled as having insulation-faults.

The tapping M is connected successively by the brushes of a switch K to three contacts N, P and Q. M is connected, firstly, to the contact N which is permanently connected to the pole 16 of the battery (Fig. 2). This charges the cable and, in order to limit the charging current to a value which is not dangerous for the Pupin coils situated near the end where the tests are made, an impedance $Z_1$ of suitable value is inserted between the contact N and the pole 16. The tapping point M is next connected to the contact P which is permanently connected, through the terminal 18 and the windings of the signaling or measuring apparatus, with one of the poles of the generator. The tapping point M is finally connected to the contact Q. This contact is earthed through an impedance $Z_2$ of suitable value, which operates with regard to the discharge current, as $Z_1$ operates with regard to the charging current. This latter arrangement avoids keeping the line charged.

The insulation-test for calling attention to a fault should be made automatically at short intervals of time on all the quads of the cable. Many well-known arrangements may be employed for this purpose; thus a rotary commutator having a brush for successively connecting the tapping point M of each of the quads of the cable with the testing device may be used.

To this end, each tapping point $M_1$, $M_2$, ... $M_n$ of the $n$ quads of the cable is connected to a sufficiently large contact. Opposite each of the contacts M are three other contacts N, P, Q; all the contacts N are connected together, all the contacts P together, all the contacts Q together. The brush of the rotary commutator makes in succession the three connections necessary for the testing of quad No. 1, then the three connections necessary for the testing of quad No. 2, and so on. The brush should rotate fairly slowly and the contacts should be fairly large to ensure that the contact lasts long enough for each of the operations (charge-test-discharge) to be performed. The commutator being in constant rotation, all the quads of the telephone cable are explored within a fairly short interval of time and, when an insulation fault occurs, attention is quickly and automatically drawn to it by means of the warning device, and the line quickly repaired when the fault has been located.

Figure 3:
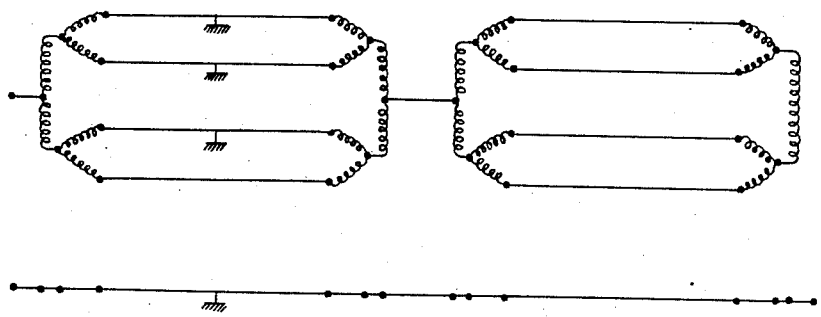
Figure 3 shows a method of locating earth leakages in a telephone cable in which a second sound quad is employed to form a loop with the faulty quad.

For locating the fault, if the quad having the earth leakage is coupled at one extremity with a sound quad, i. e. a quad having no defects, the ordinary loop method for locating earth leakages may be employed. The upper portion of Figure 3 is a diagram of two quads with their coupling transformers. The middle point of the line windings of the phantom circuit form the ends of the system. One quad is sound, the other leaks to earth. On condition that the current only enters at the two ends of the resultant conductor these two quads are equivalent to a complex conductor, a diagram of which is represented by the lower portion of Figure 3. This conductor has an earth leakage situated at the same distance from the ends as the earth leakage or leakages existing in the faulty quad. The resistance situated between the testing point and the leakage may therefore be measured by any usual loop-method, for example, Murray's or Varley's loop. If the galvanometer is connected to earth and the bridge adjusted so that no current traverses the galvanometer, the corresponding points of the four conductors forming the quad will be maintained at the same potential since the complex conductor will be supplied with current at the two ends and no current will pass by the leakage.

The positions of the battery and the galvanometer may be interchanged without altering the regulation of the bridge; and in the new position the galvanometer will not be traversed by current. Murray's or Varley's loop may again be applied in this case, and gives the same result as above, although the corresponding points of the quad are not necessarily at the same potential.

Figure 4:
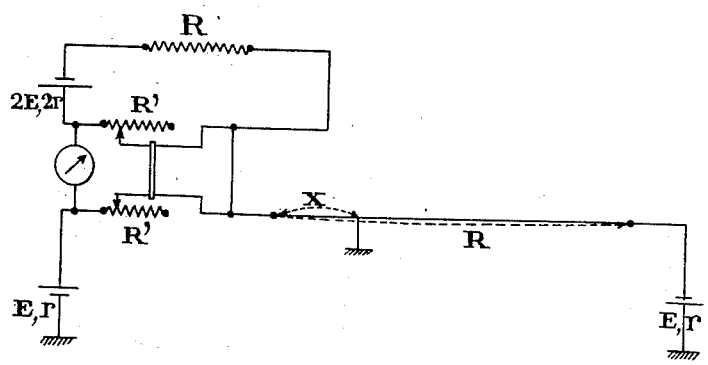
Figure 4 shows a method for locating an earth leakage in a quad in which it is impossible to employ the loop-test method.

If no sound quad is available as a return cable, the following improvement in Siemens's method may be employed. This improvement makes possible the locating of a fault by the aid of one measuring apparatus only. Figure 4 shows a diagram of the principle of this method. To each extremity of the quad of resultant resistance R, i. e. to the middle point of each phantom transformer, are connected identical batteries of electromotive force E and internal resistance $r$, the opposite poles of which are earthed. At the extremity nearest to the leakage an adjustable resistance $R^1$ is placed between the battery and the cable, and this resistance is varied until the current flowing through it is of the same strength as if the earth leakage did not exist. Then if I is the current flowing, we have:—

$$I = \frac{2E}{R + R^1 + 2r}$$

Under these conditions no current passes by the leakage; the latter is thus at the same potential as the earth. The equal voltage drops between the two batteries and the leakage, lead to equal values for the resistances placed between the leakage and the two batteries. Thus $$r + R' + X = \frac{R + R' + 2R}{2}$$

X being the resultant resistance of the part of the quad situated between the extremity and the leakage.

To verify that the leakage is at the same potential as the earth, a reference circuit is formed (Fig. 4), the resistance of which is constantly equal to that of the original supposed faultless circuit. This circuit comprises a battery of electromotive force 2E and internal resistance $2r$, a fixed resistance R and an adjustable resistance R' constantly equal to the adjustable resistance placed in series with the quad. A handle allows these two equal resistances to be varied simultaneously. These two resistances R' are connected together at one end, and a galvanometer inserted between the two other ends. When the galvanometer is not traversed by any current the voltage-drops in the two resistances R' are equal and will then be traversed by equal currents and no current passes by the leakage.

According to the invention, the device is provided with all the necessary components for making the insulation test, for measuring the insulation resistance, and for locating the fault in the line. The device is of special interest when the cable to which it is applied is submitted to the influences of a power line. As soon as an insulation-fault occurs in the line, attention is automatically drawn to it by the warning device and the importance of the fault verified by the measuring apparatus. The necessary precautions may then be taken for protecting the cable before a short-circuiting of the power line takes place, and the fault located.

The present invention is not limited in any way to the particular case of a quad forming two real circuits and a phantom circuit. It may be applied to uncoupled pairs of conductors; in this case the middle point of the line winding of the terminal transformer of each real circuit is used as the tapping point M. It may also be applied to phantom circuits of a higher order than the first. Moreover the arrangement employing the middle points of the line windings of the coupling transformers for measuring or locating purposes may easily be applied to other measurements, and to the locating of faults other than earth leakages; alternating current measurements, if necessary through high dielectric rigidity transformers, may also be made from these points.

I claim:

1. An apparatus for making tests and measurements on the conductors of a tele-communication line comprising a phantom circuit, without interfering with the operation of the line, comprising the combination of means for charging the line, a sensitive relay for testing the insulation of the line, means for measuring the insulation resistance of the line, a switch for short-circuiting the sensitive relay and the measuring apparatus alternately, and means for discharging the line when the test or measurement has been made, the connection to the line being made through the middle point of the line windings of one of the transformers of the line situated at one end of the phantom circuit.

2. For the maintenance of tele-communication lines of the kind formed by a plurality of groups of conductors forming several phantom circuits, the connecting of each middle point of the line windings of the coupling transformers of each phantom circuit to a plurality of contacts, and means for automatically connecting each of said contacts of each line through a testing and measuring device, whereby each of the lines are tested in sequence.

3. An apparatus as claimed in claim 2 wherein each line is successively submitted to a charging, testing, and discharging operation.

4. For the maintenance of quads and like tele-communication lines comprising a phantom circuit, an apparatus for testing and measuring the insulation of the quads which is connected to the middle point of the line windings of one of the terminal transformers situated at one end of the phantom circuit, an earth return circuit for said apparatus, means for automatically indicating the occurrence of a fault, and means for locating the position of said fault.

5. An apparatus as claimed in claim 4 wherein the middle point of the line windings of the other terminal transformer is insulated.

6. The method of finding or locating faulty conductors in tele-communication lines comprising a phantom circuit, which consists in connecting the testing apparatus to the middle point of the line windings of the coupling transformer of the phantom circuit, and then performing the tests by means of said apparatus.

7. The method for finding or locating faulty conductors in tele-communication lines comprising a phantom circuit, which consists in connecting the testing apparatus between the middle point of the line windings of the transformer situated at one end of the phantom circuit, and the earth, and then performing the test by means of said apparatus.

8. The method of testing, measuring the insulation resistance of, and locating the faults in tele-communication lines comprising a phantom circuit, without interfering with the functioning of said lines, which consists in making tapping points at the middle points of the line windings of the transformers situated at the ends of the phantom circuit, and completing the testing, measuring and locating circuits through said points, and then testing, measuring and locating the faults.

9. The method of locating faults in a group of identical conductors of a tele-communication line comprising a plurality of such groups, each group comprising a phantom circuit, which consists in connecting the middle point of the line windings of the transformer situated at one end of a sound group to the middle point of the line windings of the transformer situated at one end of a faulty group, and then connecting the middle points of the transformers situated at the other ends of the sound and faulty groups to an apparatus whereby the fault may be located by a suitable loop method.

In testimony whereof I have hereunto affixed my signature.

GEORGES VIARD.

Certificate of Correction

Patent No. 1,801,182. Granted April 14, 1931, to

GEORGES VIARD

It is hereby certified that error appears in the printed specification of the above-numbered patent requiring correction as follows: Page 3, lines 73 to 75, strike out the equation and insert instead $$r + R' + X = \frac{R + R' + 2r}{2};$$

and that the said Letters Patent should be read with this correction therein that the same may conform to the record of the case in the Patent Office.

Signed and sealed this 26th day of May, A. D. 1931.

[SEAL.]

M. J. MOORE,
*Acting Commissioner of Patents.*